United States Patent [19]

Gay et al.

[11] Patent Number: 5,390,901
[45] Date of Patent: Feb. 21, 1995

[54] ENERGETIC MATERIAL FEEDER

[75] Inventors: Richard L. Gay, Chatsworth; Jerold Guon, Woodland Hills; John C. Newcomb, Simi Valley; Albert E. Stewart, Lake View Terrace, all of Calif.

[73] Assignee: Rockwell International Corporation, Seal Beach, Calif.

[21] Appl. No.: 126,855

[22] Filed: Sep. 27, 1993

[51] Int. Cl.⁶ ............................ C21C 7/00; B01J 4/00
[52] U.S. Cl. .................................... 266/216; 588/900
[58] Field of Search ................. 266/200, 216; 75/402, 75/560; 588/201, 202, 203, 900; 222/196, 198

[56] References Cited

U.S. PATENT DOCUMENTS

| | | | |
|---|---|---|---|
| 3,472,431 | 10/1969 | Bodine, Jr. | 222/196 |
| 3,899,322 | 8/1975 | Yosin et al. | 75/402 |
| 4,431,612 | 2/1984 | Bell et al. | 588/900 |

*Primary Examiner*—Scott Kastler
*Attorney, Agent, or Firm*—H. Fredrick Hamann; Harry B. Field; Steven E. Kahm

[57] ABSTRACT

A feed system for feeding solid propellant or explosive energetic materials, e.g. in the form of chunks, into a molten salt furnace for destruction of said materials by oxidation with air, while substantially avoiding the danger of detonation of such materials during feeding. The system comprises a feed hopper separated from the molten salt furnace by a barrier such as a concrete wall. The feed hopper is preferably vibrated to move the chunks of waste to an inclined chute which passes through a penetration in the barrier to the furnace, the chute also being preferably vibrated to facilitate passage of the waste material. The chunks of waste are discharged from the inclined chute either directly into the molten salt bath in the furance, or added incrementally thereto by a lock valve arrangement.

7 Claims, 1 Drawing Sheet

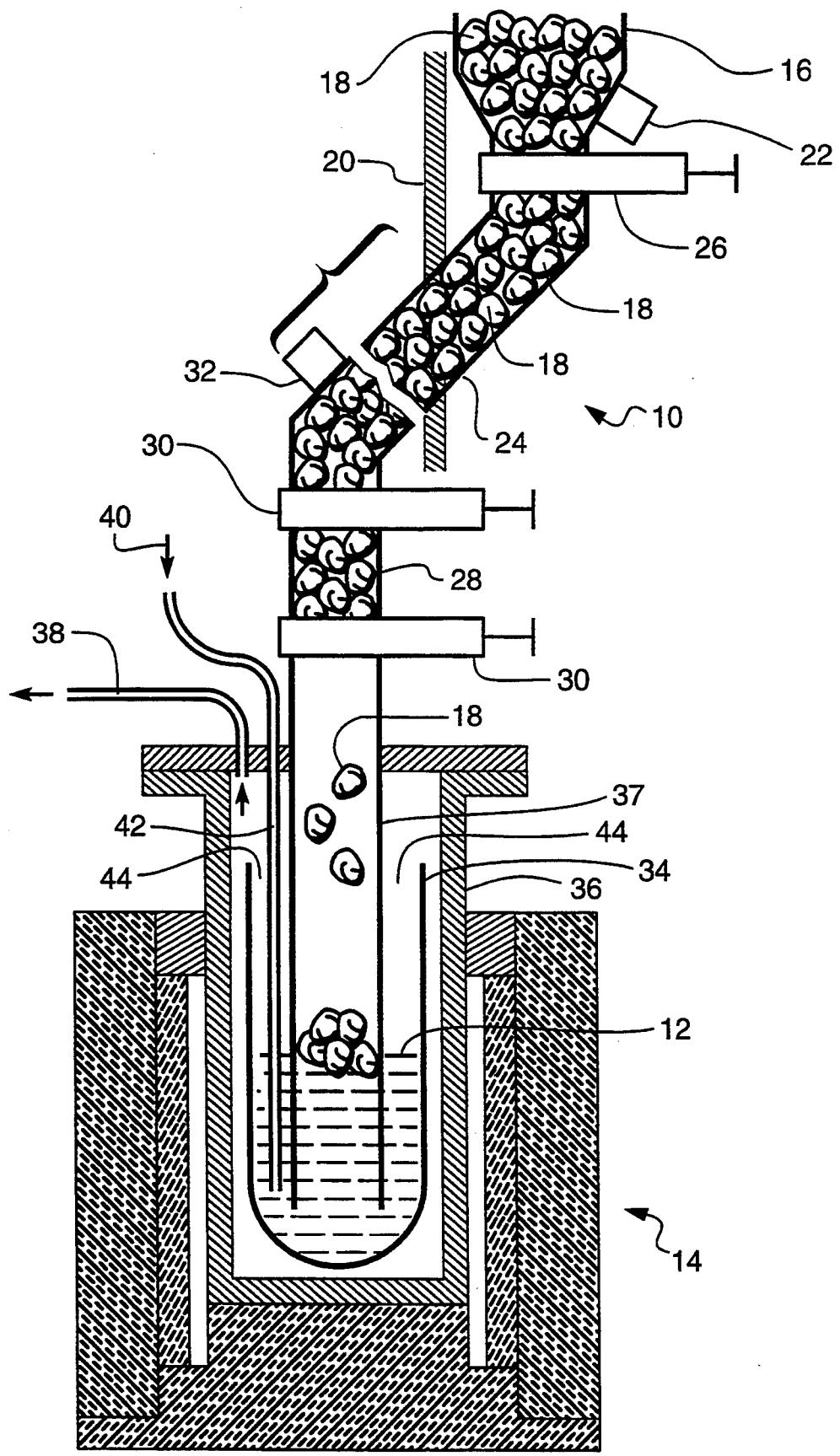

ENERGETIC MATERIAL FEEDER

BACKGROUND OF THE INVENTION

1. Field of the Invention

This invention relates to the destruction of energetic materials, such as propellants and explosives, and is particularly directed to an improved feed system for feeding solid propellant or explosive materials, e.g. in the form of chunks, into a waste destruction system, such as a molten salt furnace, while preventing detonation of such propellant or explosive material.

2. Description of the Prior Art

Propellants and explosives are energetic systems containing energetic groups such as nitrate and azide groups, and finely-divided metal particles. The problem is to dispose of these materials as a waste, safely. The use of a molten salt bath containing alkali metal carbonate for destroying propellant and explosive waste has been developed. However, energetic materials, such as propellants or explosives, potentially can detonate if located near a hot surface such as a molten salt bath, during waste disposal. High friction devices can also cause detonations or ignition.

SUMMARY OF THE INVENTION

The feed system for propellant or explosive energetic materials used for feeding into a waste treatment device, such as a molten salt furnace, must be located in a separate area from the furnace, to avoid detonation of such material during feeding. According to the invention, a physical barrier, such as a concrete wall, is used to separate the feeder from the furnace. The feed device comprises a feed hopper which is preferably vibrated, to move chunks or pieces of energetic waste material into an inclined chute. The inclined chute passes through a penetration in the wall to the furnace. The chute is preferably vibrated to facilitate transport of the feed material which can be dropped directly into the molten salt furnace, or added in increments thereto by means of a lock hopper, e.g. comprising a double lock-valve arrangement.

Accordingly, in its broad aspects, the present invention is directed to a feed system for feeding propellant or explosive energetic waste into a molten salt-containing furnace while avoiding detonation of such waste, which comprises a feed hopper for receiving solid pieces of such waste, a furnace containing a molten salt, separated from said feed hopper, a barrier between the feed hopper and the furnace, the barrier having an aperture therein, and an inclined chute communicating with the feed hopper and the furnace for transporting the solid pieces of waste to said furnace and into the molten salt therein, the chute passing through the aperture in the barrier.

OBJECTS OF THE INVENTION

It is accordingly an object of the present invention to provide an improved feed system for feeding energetic materials, such as propellants or explosives, to a waste destruction system.

Another object is the provision of a system for feeding solid propellant or explosive materials into a molten salt bath for destruction of the propellant or explosive, while avoiding or substantially reducing the danger of detonation of such energetic materials during transport of such materials from the feeding device and into the hot environment adjacent the molten salt furnace.

Other objects and advantages of the invention will be apparent or made obvious by the description below of a preferred embodiment of the invention.

BRIEF DESCRIPTION OF THE DRAWING

The sole Figure of the drawing shows a schematic illustration of a preferred embodiment of an energetic material feed system of the invention.

DETAILED DESCRIPTION OF A PREFERRED EMBODIMENT OF THE INVENTION

Referring to the Figure of the drawing, the feed system 10 of the invention is designed to safely transport solid explosive or propellant waste to a molten salt bath 12 contained in an electric furnace 14, for destruction of such energetic material while eliminating or substantially reducing the potential for detonation of such material during transport into the environment of the hot furnace.

For this purpose, a feed hopper 16 for receiving propellant or explosive chunks, indicated at 18 is located in a zone separated and remote from the electric furnace containing the molten salt bath 12, by providing a barrier 20 such as a concrete wall between the feed hopper 16 and the furnace 14. In preferred practice a vibrator device indicated at 22 is provided on the feed hopper 16 to facilitate movement of the energetic waste material chunks 18 out of the feed hopper and into an inclined chute 24 communicating with the bottom of the feed hopper 16. The vibrator device 22 can be any well known type of vibrator such as a pneumatic or electromechanical vibrator. Incremental passage of the waste chunks 18 from feed hopper 16 into the inclined chute 24 is controlled by means of a control valve 26.

The upper end of the downwardly inclined chute 24 passes through a penetration or aperture 26 in the barrier wall 20 and terminates at its lower end in a lock hopper 28 having a double lock valve arrangement as indicated at 30. The inclined chute 24 is preferably vibrated by means of a vibrator at 32 similar to vibrator 22, to facilitate transport of the energetic chunks 18 downwardly through the inclined chute 24. By means of the lock hopper 28, the feed chunks 18 introduced therein from the chute 24 can be dropped in increments via valve 30 into the molten salt bath 12 in furnace 14.

The molten salt bath 12 into which the propellant or explosive waste chunks 18 are dropped from the lock hopper 28, is contained in an alumina tube 34 located within a furnace liner 36, e.g. of Inconel, within the electric furnace. The molten salt bath 12 contains an alkali metal carbonate such as sodium carbonate, potassium carbonate or lithium carbonate, or mixtures thereof. Representative molten salt baths can contain 50% sodium carbonate and 50% potassium carbonate, by weight, or a lithium carbonate-sodium carbonate mixture containing 42 mol % lithium carbonate and 58 mol % sodium carbonate. Also, mixtures of sodium carbonate and alkali metal hydroxide such as sodium hydroxide, can be employed. Temperature of the molten salt bath 12 can be maintained from about 300° to about 1100° C., preferably about 700° to about 900° C.

The waste propellant or explosive feed chunks 18 are fed incrementally from lock hopper 28 and drop through a downcomer 37 into the molten salt bath 12 in tube 34 for submerged reactive contact of the waste feed chunks 18 with the molten salt and decomposition or oxidation of the waste feed chunks to form essentially $CO_2$, nitrogen and water vapor. For carrying out the decomposition or oxidation of the explosive or propellant chunks 18 in the salt bath 12, process air is introduced at 40 and passed downwardly through a narrow tube 42 provided within tube 34 and into the molten salt bath 12. The product gas formed in the reaction, a mixture of $CO_2$, $N_2$ and water vapor passes upwardly through an annulus 44 between the wall of tube 34 and downcomer 37 to the gas vent 38.

It will be noted that in the invention feed system illustrated in the drawing, the feed chunks maintained and stored in the feed hopper 16 are separated from the furnace 14 by the barrier 20, and hence are maintained at a sufficiently low temperature in relation to the environment of furnace 14, to substantially avoid the danger of detonation of the feed chunks in the hopper 16. Although the feed chunks in the lower end of the inclined chute 24 and in the lock hopper 28 are positioned on the same side of the barrier 20 as the furnace 14, and hence pass through a zone adjacent to the hot furnace 14, the passage of the feed chunks through the lower portion of the inclined chute and through the lock hopper 28 is sufficiently rapid so that the temperature of the feed chunks 18 therein do not rise sufficiently prior to being dropped into the salt bath 12, so as to substantially avoid potential detonation.

Instead of employing a lock hopper and valve arrangement 28, 30 for incremental feeding of the waste chunks 18 from chute 24 to the molten salt bath 12, such lock hopper and associated valve can be omitted and the feed chunks 18 dropped directly from the lower end of the inclined chute 24 through downcomer 37 and into the molten salt bath 12 in tube 34.

It will be understood that while the solid energetic waste material can often be in the form of chunks, such solid material can be in the form of smaller pieces, e.g. particles.

From the foregoing, it is seen that the invention provides an improved energetic feed system for feeding solid explosive or propellant waste material into a molten salt bath while eliminating or substantially reducing the potential for detonation of such solid waste material during transport from a feed hopper into a molten salt bath for destruction of such waste material.

It is to be understood that what has been described is merely illustrative of the principles of the invention and that numerous arrangements in accordance with this invention may be devised by one skilled in the art without departing from the spirit and scope thereof.

What is claimed is:

1. A feed system for feeding propellant or explosive energetic waste into a molten salt-containing furnace while avoiding detonation of said waste which comprises
   a feed hopper for receiving solid pieces of said waste,
   a furnace containing a molten salt, separated from said hopper,
   a barrier between said feed hopper and said furnace, said barrier having an aperture therein
   an inclined chute communicating with said feed hopper and said furnace for transporting said solid pieces of waste to said furnace and into said molten salt, said chute passing through said aperture in said barrier,
   a first tube in said furnace, said molten salt being disposed solely in said tube,
   a downcomer within said tube and communicating therewith, whereby pieces of solid waste are discharged into said downcomer and into said tube,
   a narrow tube within said first tube and outside said downcomer for passing process air into the molten salt in said first tube.

2. A feed system as defined in claim 1, including means for vibrating said feed hopper, and means for vibrating said inclined chute.

3. A feed system for feeding propellant or explosive energetic waste into a molten salt-containing furnace while avoiding detonation of said waste during feeding which comprises
   a feed hopper for receiving chunks of said waste,
   a furnace remote from said feed hopper,
   a tube in said furnace and containing a molten salt,
   a barrier separating said feed hopper from said furnace,
   an inclined chute having an upper end and a lower end, said chute communicating at its upper end with said feed hopper, said inclined chute passing through said barrier,
   means controlling passage of said chunks of energetic waste from said feed hopper into said inclined chute,
   a lock hopper communicating with the lower end of said inclined chute for receiving said chunks of waste, and for incrementally discharging said chunks of waste into the molten salt in said tube,
   means for introducing process air into said molten salt in said tube, and
   means for discharging product gas from said tube.

4. A feed system as defined in claim 3, and including means for vibrating said feed hopper.

5. A feed system as defined in claim 4, and including means for vibrating said inclined chute.

6. A feed system for feeding propellant or explosive energetic waste into a molten salt-containing furnace while avoiding detonation of said waste which comprises
   a feed hopper for receiving solid pieces of said waste,
   a furnace containing a molten salt, separated from said hopper,
   a barrier between said feed hopper and said furnace, said barrier having an aperture therein,
   an inclined chute communicating with said feed hopper and said furnace for transporting said solid pieces of waste to said furnace and into said molten salt, said chute passing through said aperture in said barrier, including a control valve at the lower end of said feed hopper for incremental passage of said solid pieces of waste from said feed hopper to said inclined chute, and a lock hopper at the lower end of said inclined chute for incrementally discharging said solid pieces of waste into the molten salt in said furnace.

7. A feed system for feeding propellant or explosive energetic waste into a molten salt-containing furnace while avoiding detonation of said waste which comprises
   a feed hopper for receiving solid pieces of said waste,
   a furnace containing a molten salt, separated from said hopper,
   a barrier between said feed hopper and said furnace, said barrier having an aperture therein
   an inclined chute communicating with said feed hopper and said furnace for transporting said solid pieces of waste to said furnace and into said molten salt, said chute passing through said aperture in said barrier, including a tube in said furnace, said molten salt being disposed in said tube, and a lock hopper at the lower end of said inclined chute for incrementally discharging said solid pieces of waste into the molten salt in said tube.

* * * * *